Aug. 1, 1967 W. J. HARADEN 3,333,607
CUTTING AND CRIMPING TOOL
Filed Dec. 16, 1964
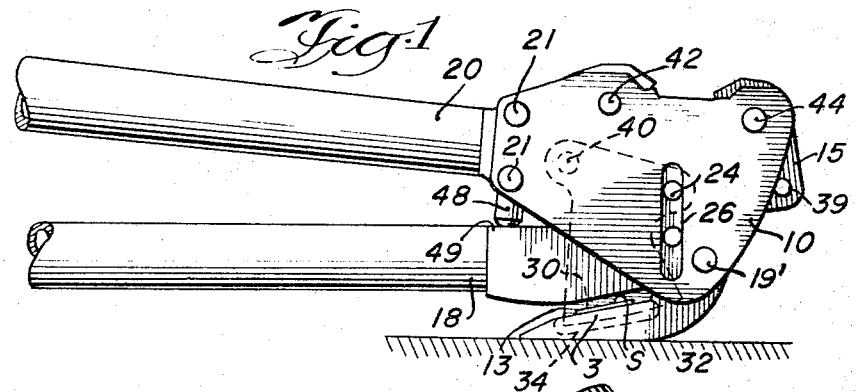
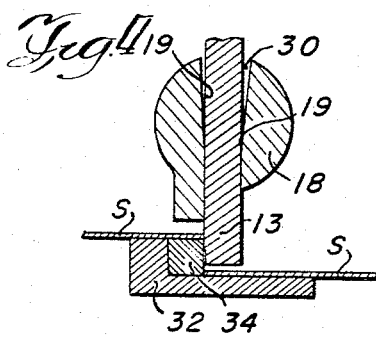
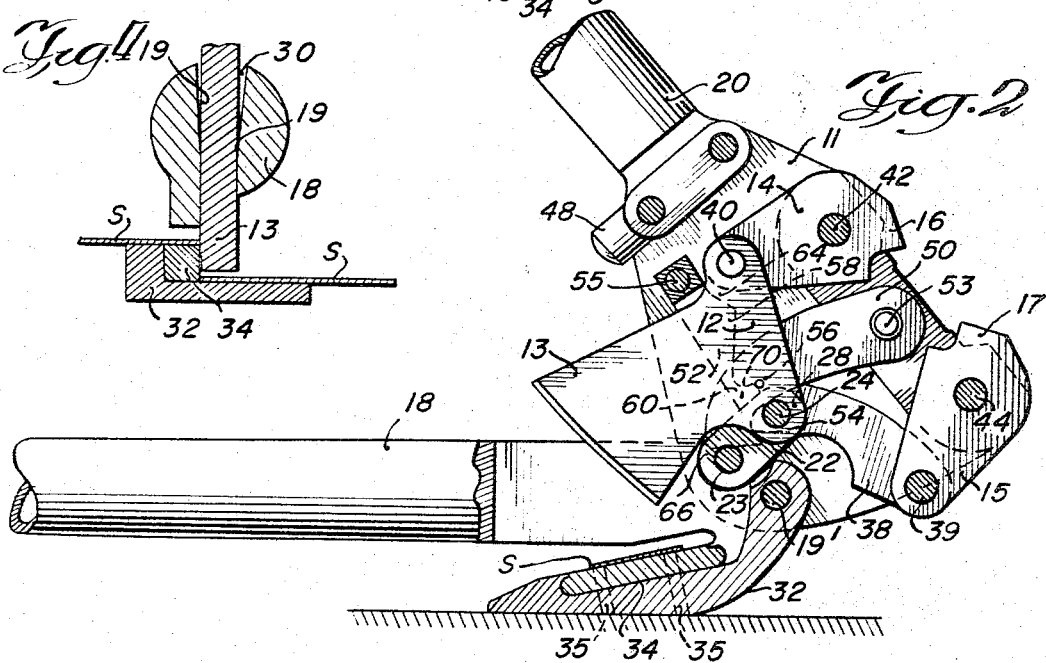
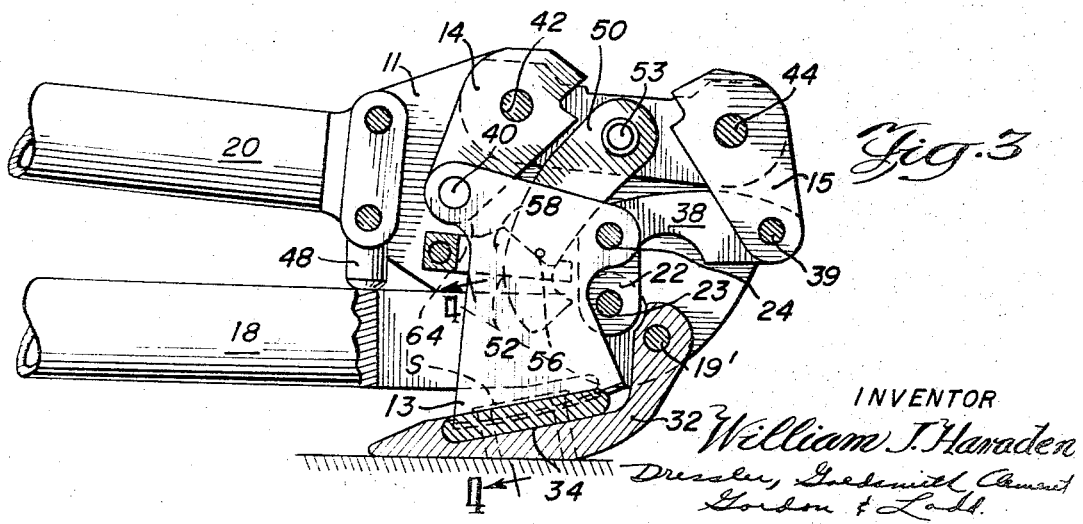
INVENTOR
William J. Haraden
Dressler, Goldsmith, Clement, Gordon & Ladd
ATTORNEYS.

United States Patent Office 3,333,607
Patented Aug. 1, 1967

3,333,607
CUTTING AND CRIMPING TOOL
William J. Haraden, Libertyville, Ill., assignor to Signode Corporation, a corporation of Delaware
Filed Dec. 16, 1964, Ser. No. 418,829
12 Claims. (Cl. 140—93.2)

This invention relates to a novel tool for crimping and cutting strap, whereby overlapped strap ends which are to be secured together by a fastener or seal may be so secured or sealed by crimping and the strap can be cut where desired, usually adjacent to the seal to remove excess strap from the package and/or to disengage the package from a supply roll or reel of the strap. More particularly, the present invention relates to a new and improved structure wherein the cutter blades and the crimping jaws so cooperate as to allow an efficient cutting and crimping action with the use of only one tool.

One embodiment of the instant invention provides a novel coaction between a pair of cutter blades wherein a movable blade will travel an increasingly greater arc than the arc displaced by the relative motion of the operator during the course of operation of the device by the operator. The linkage interrelation between the handle that is manipulated, the operator and the movable cutter blade is such that the mechanical advantage is greatest at the beginning of the stroke and the relative rate of movement of the blade is greatest at the end of the stroke. This is most advantageous in that it provides the greatest mechanical advantage at the moment when shearing is initiated and provides for increasingly rapid, smooth, clean shearing of the strap. Also, the movable blade can effect a large sweep within a short distance for efficient shearing action. Another feature of this embodiment of the invention is that the movable blade is supported throughout its travel in order to maintain the proper engagement and proper shearing relation thereof with the second blade.

In one form of the invention, the cutting tool comprises a pair of side plates and a blade supporting member mounted for pivotal movement with respect to the side plates. A first cutter blade is at least partially positioned between the side plates and a second cutter blade is connected to the blade supporting member and is positioned for shearing engagement with the first cutter blade. The blade supporting member has a recess extending therethrough for receipt of the cutter blade during movement of the side plates with respect to the blade supporting member, and the second cutter blade is positioned adjacent the recess so that the first cutter blade will engage the second cutter blade to attain an effective shearing action after the forward edge of the first cutter blade passes through the recesses. In a preferred embodiment the blade supporting member comprises a movable handle. A second handle is affixed to the side plates and projects rearwardly therefrom to provide manual gripping means which are operable to open and close the cutter blades.

The mechanism is so arranged that the movable cutter blade is interconnected with and integrally arranged as part of a combination cutter and sealer activating linkage having parts intercoordinated for simultaneous manipulation of the sealing or crimping jaws and the cutter blades. The linkage is so arranged with the handles and the side plates that as the handles are brought together the crimping jaws are moved together with an increasing mechanical advantage and the cutter blades are moved together with an increasing rate of movement with respect to the rate of movement of the handles. This provides a maximum mechanical advantage at the stage where shearing is initiated and where it is most needed. As the operation of the mechanism through the coordinated linkage progresses, relative rate of movement of the movable cutter blade increases to rapidly and cleanly shear the strap disposed between the blades and relatively stationary with respect to the fixed blade.

The foregoing and other features and advantages of the present invention will become more readily apparent from the following detailed description and embodiment of the invention and from the accompanying drawings illustrating the embodiment of the invention, in which like reference numerals refer to like parts, and in which:

FIGURE 1 is a side elevation of a tool embodying the present invention;

FIG. 2 is a side elevation of the crimping and cutting tool of FIG. 1 with the operating handles in an open position, with a side plate removed to show the operating linkage of the tool, and with a portion of the blade supporting handle in section to show the cutter blade position;

FIG. 3 is a side elevation, similar to that shown in FIG. 1, with a side plate removed and with a portion of the blade supporting handle in section to show the tool linkage at full closure thereof; and FIG. 4 is a cross-sectional view taken along the line 4—4 of FIG. 3, showing the cutting blades in shearing engagement.

There is illustrated in the drawings a tool including a pair of substantially parallel side plates 10 and 11 between which are mounted a cutter blade link 12 carrying a cutter or shear blade 13, and a pair of crimping jaw links 14 and 15 carrying crimping jaws 16 and 17. The crimping jaw linkage which is discussed below is similar to that disclosed in United States Letters Patent No. 3,040,606 to A. I. Ericsson, issued June 26, 1962, and entitled "Strap Sealing Tool With Full Stroke Compelling Means."

In the illustrative embodiment of FIGURES 1–3, a blade supporting handle 18 is pivotally mounted with respect to the side plates 10, 11 by means of a pivot pin 19'. A second handle 20 extends rearwardly of the side plates and is connected to the side plates by suitable connecting means 21 such as bolts. The handles are located in coplanar relationship to achieve optimum leverage.

Relative movement of the side plates with respect to the blade supporting handle 18 causes operation of the crimping jaws and the cutting members. The movable blade 13 is reciprocally connected to the handle 18 by a link 22 which is connected to handle 18 by pin 23 and is connected to the cutter link 12 by a stop or guide pin 24. The pin 24 slides within elongated slots 26 in the side plates which confine movement of the pin 24 and the end 28 of the cutter link 12 to a predetermined reciprocation path.

As seen most clearly in FIGURE 4, the handle 18 includes a recess 30 for receipt of the blade 13 during its travel. A second blade assembly 32 is connected to or formed integral with the handle 18. A second cutting blade 34 is affixed to the assembly 32 by means of suitable connectors 35 such as screws. The cutting blades are positioned for effective shearing action and the movable cutter blade 13 is supported throughout its entire cutting stroke by the walls 19 of the handle 18 which define the recess 30.

The crimping jaws 16 and 17 are reciprocally connected to the handle 18 by connecting link 38 which is pivotally connected to crimping jaw link 15 by pivot pin 39, and cutter link 12 which is pivotally connected to crimping jaw link 14 by pivot pin 40. The jaw links are pivotally connected to the side plate by pins 42 and 44.

Movement of the handle 20 toward the handle 18 will cause the link 22 to move upwardly (with respect to FIGURES 1 and 3) and thereby pivot pins 39 and 40 will be moved outwardly causing the jaws 16 and 17 to close and further causing the movable cutter blade 13 to swing in a greater counterclockwise arc than would be achieved if the cutter link 12 was stationary with respect to the side plates. The motion of the cutter blade 13 due to the reciprocating linkage provides a highly effective shearing action when the cutter blades 13 and 34 are juxtaposed. A large blade can be utilized in a relatively small tool, and an unusually large blade sweep will occur within a relatively small area.

As will be seen from the foregoing description of the mechanical arrangement of this embodiment of the invention, as the side plates in the handle 20 are rotated from a fully open position through the position shown in FIGURE 2 to the closed position shown in FIGURE 3, they will rotate about the pivot pin 19'. Holding the handle 18 with the fixed cutter bracket 32 in a fixed position, the guide pin 24 will move upwardly within the guide slots 26 and the link 22 will be caused to rotate in a counterclockwise position as viewed in FIGURES 2 and 3 to move that portion of the linkage system toward such a position with the axis of the pivots 19', 23 and 24 are coplanar. (Actually the coplanar position is never fully achieved in this particular embodiment of the invention.) The movable cutter blade forms a link between the jaw link 14 and the guide pin 24 by being pivoted on the guide pin 24 and the pivot pin 40 connected to the jaw link 14 at its inner movable end.

As the guide plates are moved downward for shearing action by the cutters, the movable blade 13 is rotated counterclockwise about the guide pin 24 and the jaw link 14 is rotated clockwise about the jaw pivot 42 so that the movement of the movable blade 13 carried by the pins 24 and 40 is a combination sweeping action of increasing speed with respect to the movement of the guide plates and handle 20 rather than merely a rotary motion about either pin 24 or pin 40 alone.

This arrangement provides, as stated, an increasing rate of movement of the movable cutter so that the mechanical advantage of the handle with respect to the cutters is greatest at the time that shearing action is initiated by engagement of the movable cutter with the strap S shown lying against the fixed cutter in all figures of the drawing. This increasing rate of movement of the blades with respect to each other and of the movable blade with respect to the side plates and handle provides very rapid shearing action which is highly desirable to provide a clean and efficient shearing of the strap S.

A stop shoulder 48 is provided to abut with the inner face 49 of the handle 18 when the movable cutter blade 13 is in complete alignment with the cutter blade 34 and the crimping jaws are in their closed position, such as depicted in FIGURE 3.

The present invention incorporates means to insure that the operator will manipulate the tool through both a full shearing and a full crimping stroke. A hook-shaped latch 50 and a trigger 52 are provided, both being spring biased in a counter-clockwise direction. Pins 53 and 55 pivotally connect latch 50 and trigger 52 respectively to the side plates 10, 11. The latch comprises a hook-holding face 54 and it carries a laterally projecting pin 56 which is employed to enable the latch to be retained in a position in which the face 54 is out of the path of the stop pin 24 when the work is not yet in position to be crimped or sheared. The trigger 52 includes a cam 58 and a hook 60 which is adapted to restrain the latch 50 by blocking the pin 56.

As the handles 20 and 18 are moved apart to provide entry of the work, the portion of the links adjacent pins 39 and 40 are drawn inwardly. When the handles are a certain distance apart, the face 64 of link 14 will contact the extending cam 58 on the trigger 52. The link 14 will force the trigger 52 in the clockwise direction (with respect to FIGURES 1–3) causing the hook 60 to move away from the pin 56, and the latch 50 will thereby be released and allowed to swing in a counter-clockwise direction. As shown most clearly in FIGURE 2, as the handle 20 is moved toward the handle 18, the stop pin 24 will fall within the confines of the hook face 54 of the latch 50. Any attempt to move the handles apart prior to completion of the full stroke will be thwarted by the engagement of the hook face 54 with the pin 24, providing an obstruction to such movement.

When the stroke is completed, the peak 66 of latch 50 abuts the wall of a recess formed in the handle for reception of the latch. The latch 50 is thereby forced in a clockwise direction, causing release of the pin 24 from the confines of the hook face 54.

As illustrated in FIGURE 3, when the stroke is completed and the latch 50 is urged clockwise, the pin 56 which extends laterally from the latch 50 is urged within the confines of the hook 60. In this manner the latch 50 is retained out of engagement with the pin 24 until the handles are again substantially separated and the trigger 52 is forced in a clockwise direction by the engagement of link face 64 with cam 58 to release the pin 56 and the latch 50. Once the pin 56 is free from the hook 60, the pin remains free during the entire stroke until the latch 50 is again forced in a clockwise direction. This is most clearly shown in FIGURE 2 wherein the face 70 of the hook 60 abuts the pin 56.

From the foregoing it will be observed that, in accordance with the principles of the invention, the illustrative embodiment shown in the drawing is effective to provide a novel coaction between the two cutter blades whereby the movable blade will travel in a greater arc than the arc displaced by the movement of the handles. A highly effective shearing action is thus provided. Additionally, the movable blade is firmly supported throughout its entire stroke within a recess formed in the handle, and hence the blades remain properly aligned even after extensive use.

Also, the invention is effective to provide a cooperative coaction between the cutter blade linkage and crimping jaw linkage. The present invention thereby allows a strap to be crimped and sheared by the same tool and the work cannot be removed until the operation is fully performed, because the handles cannot be opened until the stroke has been completed.

Although the novel concepts of the invention have been explained in terms of an illustrative embodiment, it will be understood that various modifications and substitutions may be made in the specific structure which has been described without departing from the spirit of the invention.

I claim:

1. A strap working tool which comprises; a first support member, a second support member mounted for pivotal movement with respect to said first support member, a first cutting member including a first cutter blade, links pivotally connecting said first cutter blade to each of said support members, a second cutting member connected to said first support member and including a second cutter blade positioned for shearing engagement with said first cutter blade and means guidingly engaging said second support member and the pivotal connection between said first cutter member and the links connecting the same to the first support member.

2. A strap working tool which comprises; a first support member, a second support member mounted for pivotal movement with respect to said first support member, a first cutting member including a first cutter blade, links pivotally connecting said first cutter blade to each of said support members, a second cutting member connected to said first support member and including a second cutter blade positioned for shearing engagement with said first cutter blade and means guidingly engaging said second support member and the pivotal connection between said first cutter member and the links connecting the same to the first support member, said first supporting member having a recess extending therethrough for receipt of said first cutter blade during movement thereof with respect to said support members.

3. A strap working tool which comprises; a first support member, a second support member mounted for pivotal movement with respect to said first support member, a first cutting member including a first cutter blade, links pivotally connecting said first cutter blade to each of said support members, a second cutting member connected to said first support member and including a second cutter blade positioned for shearing engagement with said first cutter blade and means guidingly engaging said second support member and the pivotal connection between said first cutter member and the links connecting the same to the first support member, the link connecting said first cutter blade to said second support member comprising one of a pair of crimping jaws pivotally connected to said second support member.

4. A strap working tool which comprises; a first support member, a second support member mounted for pivotal movement with respect to said first support member, a first cutting member including a first cutter blade, links pivotally connecting said first cutter blade to each of said support members, a second cutting member connected to said first support member and including a second cutter blade positioned for shearing engagement with said first cutter blade and means guidingly engaging said second support member and the pivotal connection between said first cutter member and the links connecting the same to the first support member, the link connecting said first cutter blade to said second support member comprising one of a pair of crimping jaws pivotally connected to said second support member, the other crimping jaw of said pair having one end thereof pivotally connected to said second support member and having the other end thereof connected by a link to said means guidingly engaging said second support member and the pivotal connection between said first cutter member and the links connecting the same to the first support member.

5. A strap working tool which comprises; a pair of side plates, a blade supporting member mounted for pivotal movement with respect to said side plates, a first cutting member at least partially positioned between said side plates and including a first cutter blade; a second cutting member connected to said blade supporting member and including a second cutter blade positioned for shearing engagement with said first cutter blade, reciprocating means linking said blade supporting member with said first cutting member whereby first directional movement of said blade supporting member with respect to said side plates will elevate said reciprocating means to move said first cutter blade in a plane parallel to said side plates in a greater arc than the arc displaced by the relative movement of said side plates with respect to said blade supporting member and toward said second cutter blade in shearing relationship therewith, and second directional movement thereof will lower said reciprocating means to move said first cutter blade away from said second cutter blade to a work-receiving position.

6. A strap working tool which comprises a pair of side plates, a handle mounted for pivotal movement with respect to said side plates, a first cutting member at least partially positioned between said side plates and including a first cutter blade formed integral with a movable link; a second cutting member connected to said handle and including a second cutter blade positioned for shearing engagement with said first cutter blade, reciprocating means linking said handle with said first cutting member whereby first directional movement of said handle with respect to said side plates will elevate said reciprocating means to move said first cutter blade in a plane parallel to said side plates in a greater arc than the arc displaced by the relative movement of said side plates with respect to said handle and toward said second cutter blade in shearing relationship therewith, and second directional movement thereof will lower said reciprocating means to move said first cutter blade away from said second cutter blade to a work-receiving position.

7. A strap working tool which comprises; a pair of side plates, a blade supporting member mounted for pivotal movement with respect to said side plates, a first cutting member at least partially positioned between said side plates and including a first cutter blade; a second cutting member connected to said blade supporting member and including a second cutter blade positioned for shearing engagement with said first cutter blade, said blade supporting member having a recess extending therethrough for receipt of the upper portion of said first cutter blade during first directional movement of said blade supporting member with respect to said side plates, said second cutter blade being positioned in the side of said recess opposite said side plates, reciprocating means linking said blade supporting member with said first cutting member whereby first directional movement of said blade supporting member with respect to said side plates will elevate said reciprocating means to move said first cutter blade in a plane parallel to said side plates in a greater arc than the arc displaced by the relative movement of said side plates with respect to said blade supporting member and toward said second cutter blade in shearing relationship therewith, and second directional movement thereof will lower said reciprocating means to move said first cutter blade away from said second cutter blade to a work-receiving position, and a fixed handle secured to said side plates and projecting rearwardly therefrom in the plane of said side plates.

8. A strap working tool which comprises; a pair of side plates, a blade supporting member mounted for pivotal movement with respect to said side plates, a first cutting member at least partially positioned between said side plates and including a first cutter blade, a second cutting member connected to said blade supporting member and including a second cutter blade positioned for shearing engagement with said first cutter blade; reciprocating means linking said blade supporting member with said first cutting member whereby first directional movement of said blade supporting member with respect to said side plates will elevate said reciprocating means to move said first cutter blade in a greater arc than the arc displaced by the relative movement of said side plates with respect to said blade supporting member and in a plane parallel to said side plates toward said second cutter blade in shearing relationship therewith, and second directional movement thereof will lower said reciprocating means to move said first cutter blade away from said second cutter blade to a work-receiving position, a pair of crimping jaws positioned between said side plates and movable in a plane parallel to said side plates between an open work-receiving position and a closed crimping position, said reciprocating means and said first cutting member being operable to link said blade supporting member with said crimping jaws whereby said jaws will open and close in response to lowering and elevation respectively of said reciprocating means.

9. A strap cutting and crimping tool which comprises; a pair of side plates, a handle mounted for pivotal movement with respect to said side plates, a first cutting member at least partially positioned between said side plates and including a first cutter blade; a second cutting member connected to said handle and including a second cutter blade positioned for shearing engagement with said first cutter blade; said pivotally mounted handle having a recess extending therethrough for receipt of said first cutter blade during first directional movement of said handle with respect to said side plates, said second cutter blade being positioned above said recess; reciprocating means linking said handle with said first cutting member whereby first directional movement of said handle with respect to said side plates will elevate said reciprocating means to move said first cutter blade in a plane parallel to said side plates in a greater arc than the arc displaced by the relative movement of said side plates with respect to said blade supporting member and toward said second cutter blade in shearing relationship therewith, and second directional movement thereof will lower said reciprocating means to move said first cutter blade away from said second cutter blade to a work-receiving position; a pair of crimping jaws positioned between said side plates and movable in a plane parallel to said side plates between an open work-receiving position and a closed crimping position, said reciprocating means and said first cutting member being operable to link said handle with said crimping jaws whereby said jaws will open and close in response to lowering and elevation respectively of said reciprocating means; and a fixed handle secured to said side plates and projecting rearwardly therefrom in the plane of said side plates.

10. A strap cutting and crimping tool which comprises; a pair of side plates, a blade supporting member mounted for pivotal movement with respect to said side plates, a first cutting member at least partially positioned between said side plates and including a first cutter blade formed integral with a movable link; a second cutting member connected to said blade supporting member and including a second cutter blade positioned for shearing engagement with said first cutter blade; said blade supporting member having a recess extending therethrough for receipt of said first cutter blade during first directional movement of said blade supporting member with respect to said side plates, said second cutter blade being positioned on the side of said recess opposite said side plates; reciprocating means linking said blade supporting member with said first cutting member whereby first directional movement of said blade supporting member with respect to said side plates will elevate said reciprocating means to move said first cutter blade in a plane parallel to said side plates in a greater arc than the arc displaced by the relative movement of said side plates with respect to said blade supporting member and toward said second cutter blade in shearing relationship therewith, and second directional movement thereof will lower said reciprocating means to move said first cutter blade away from said second cutter blade to a work-receiving position; a pair of crimping jaws positioned between said side plates and movable in a plane parallel to said side plates between an open work-receiving position and a closed crimping position, said reciprocating means and said first cutting member being operable to link said blade supporting member with said crimping jaws whereby said jaws will open and close in response to lowering and elevation respectively of said reciprocating means; and a fixed handle secured to said side plates and projecting rearwardly therefrom in the plane of said side plates.

11. A strap cutting tool which comprises; a pair of side plates, a blade supporting member moutned for pivotal movement with respect to said side plates, a first cutting member at least partially positioned between said side plates and including a first cutter blade; a second cutting member connected to said blade supporting member and including a second cutter blade positioned for shearing engagement with said first cutter blade; reciprocating means linking said blade supporting member with said first cutting member whereby first directional movement of said blade supporting member with respect to said side plates will elevate said reciprocating means to move said first cutter blade in a plane parallel to said side plates in a greater arc than the arc displaced by the relative movement of said side plates with respect to said blade supporting member and toward said second cutter blade in shearing relationship therewith, and second directional movement thereof will lower said reciprocating means to move said first cutter blade away from said second cutter blade to a work-receiving position; and means communicating with said reciprocating means for compelling a full cutting movement.

12. A strap cutting and crimping tool which comprises; a pair of side plates, a blade supporting member mounted for pivotal movement with respect to said side plates, a first cutting member at least partially positioned between said side plates and including a first cutter blade; a second cutting member connected to said blade supporting member and including a second cutter blade positioned for shearing engagement with said first cutter blade; reciprocating means linking said blade supporting member with said first cutting member whereby first directional movement of said blade supporting member with respect to said side plates will elevate said reciprocating means to move said first cutter blade in a greater arc than the arc displaced by the relative movement of said side plates with respect to said blade supporting member in a plane parallel to said side plates toward said second cutter blade in shearing relationship therewith, and second directional movement thereof will lower said reciprocating means to move said first cutter blade away from said second cutter blade to a work-receiving position; a pair of crimping jaws positioned between said side plates and movable in a plane parallel to said side plates between an open work-receiving position and a closed crimping position, said reciprocating means and said first cutting member being operable to link said blade supporting member with said crimping jaws whereby said jaws will open and close in response to lowering and elevation respectively of said reciprocating means; and means communicating with said reciprocating means for compelling a full cutting movement.

References Cited

UNITED STATES PATENTS

| | | | |
|---|---|---|---|
| 752,436 | 2/1904 | Boyd | 30—251 |
| 777,366 | 12/1904 | Bergmark | 30—251 |
| 1,204,482 | 11/1916 | Parker | 30—251 X |
| 1,874,518 | 8/1932 | Harvey | 140—93.2 |
| 1,876,499 | 9/1953 | Hoffmann | 140—93.4 |
| 2,436,260 | 2/1948 | Klenk. | |
| 2,579,272 | 12/1951 | Ralston | 30—251 X |
| 2,797,714 | 7/1957 | MacChesney | 140—93.2 |

WILLIAM J. STEPHENSON, *Primary Examiner.*